(12) United States Patent
Leventhal

(10) Patent No.: US 8,180,680 B2
(45) Date of Patent: May 15, 2012

(54) METHOD AND SYSTEM FOR RECOMMENDING A PRODUCT OVER A COMPUTER NETWORK

(76) Inventor: Jeffrey Leventhal, Huntington, NY (US)

( * ) Notice: Subject to any disclaimer, the term of this patent is extended or adjusted under 35 U.S.C. 154(b) by 1244 days.

(21) Appl. No.: 11/735,904

(22) Filed: Apr. 16, 2007

(65) Prior Publication Data

US 2008/0255933 A1 Oct. 16, 2008

(51) Int. Cl.
*G06Q 30/00* (2006.01)
(52) U.S. Cl. ..................................................... 705/26.1
(58) Field of Classification Search .................... 705/26, 705/27, 26.1, 14
See application file for complete search history.

(56) References Cited

U.S. PATENT DOCUMENTS

| | | | |
|---|---|---|---|
| 6,029,141 | A | 2/2000 | Bezos et al. |
| 6,134,532 | A | 10/2000 | Lazarus et al. |
| 6,236,977 | B1 | 5/2001 | Verba et al. |
| 6,266,649 | B1 | 7/2001 | Linden et al. |
| 6,317,722 | B1 | 11/2001 | Jacobi et al. |
| 6,321,221 | B1 | 11/2001 | Bieganski |
| 6,334,127 | B1 | 12/2001 | Bieganski et al. |
| 6,356,879 | B2 | 3/2002 | Agarwal et al. |
| 6,412,012 | B1 | 6/2002 | Bieganski et al. |
| 6,853,982 | B2 | 2/2005 | Smith et al. |
| 6,912,505 | B2 | 6/2005 | Linden et al. |
| 7,075,000 | B2 | 7/2006 | Gang et al. |
| 7,082,407 | B1 | 7/2006 | Bezos et al. |
| 7,113,917 | B2 | 9/2006 | Jacobi et al. |
| 7,143,089 | B2 | 11/2006 | Petras et al. |
| 7,774,229 | B1 | 8/2010 | Dernehl et al. |
| 2001/0037283 | A1 | 11/2001 | Mullaney |
| 2001/0047290 | A1 | 11/2001 | Petras et al. |
| 2002/0042733 | A1 | 4/2002 | Lesandrini et al. |
| 2002/0069116 | A1 | 6/2002 | Ohashi et al. |
| 2002/0072968 | A1 | 6/2002 | Gorelick et al. |
| 2002/0103698 | A1 | 8/2002 | Cantrell |
| 2002/0107758 | A1 | 8/2002 | Takakura et al. |
| 2002/0161838 | A1 | 10/2002 | Pickover et al. |
| 2003/0023490 | A1 | 1/2003 | Lenyon et al. |
| 2003/0036944 | A1 | 2/2003 | Lesandini et al. |

(Continued)

FOREIGN PATENT DOCUMENTS

WO WO9722074 A1 6/1997

(Continued)

OTHER PUBLICATIONS

Happy 100% Mall-Free Holidays From ThisNext.com; Find Gift Ideas by Discovering People With Common Interests; PR Newswire. New York: Nov. 20, 2006; http://proquest.umi.com/pqdweb?did=1165351351&sid=1&Fmt=3&clientId=19649&RQT=309&VName=PQD.*

(Continued)

*Primary Examiner* — Mila Airapetian
(74) *Attorney, Agent, or Firm* — Patent Authority LLC; Elliot Furman

(57) ABSTRACT

A product is recommended over a computer network by initiating a recommendation network by creating an active advertisement object of a product on an electronic medium. A recommendation request is received from a user viewing the electronic medium to recommend the product to at least one more viewer. The viewer may be a recommended user. The user and the recommended user or users form a recommendation network. The active advertisement object is recreated on another electronic medium. The recommendation request and the recreation may be repeated, and a recommendation chain is determinable.

18 Claims, 9 Drawing Sheets

U.S. PATENT DOCUMENTS

| | | |
|---|---|---|
| 2003/0225842 A1 | 12/2003 | Li et al. |
| 2004/0103022 A1 | 5/2004 | Chilcoat et al. |
| 2004/0167828 A1 | 8/2004 | Bria et al. |
| 2004/0193484 A1 | 9/2004 | Allen |
| 2004/0205065 A1 | 10/2004 | Petras et al. |
| 2004/0215500 A1 | 10/2004 | Monahan |
| 2004/0215542 A1 | 10/2004 | Rossides |
| 2004/0215793 A1 | 10/2004 | Ryan et al. |
| 2004/0225715 A1 | 11/2004 | Gottfrind |
| 2004/0230484 A1 | 11/2004 | Greenlee |
| 2004/0254831 A1 | 12/2004 | Dean |
| 2005/0060283 A1 | 3/2005 | Petras et al. |
| 2005/0080670 A1 | 4/2005 | Kehoe |
| 2005/0096982 A1 | 5/2005 | Morton et al. |
| 2005/0119937 A1 | 6/2005 | Estes |
| 2005/0216560 A1 | 9/2005 | Pohja et al. |
| 2005/0234998 A1 | 10/2005 | Lesandrini et al. |
| 2005/0240535 A1 | 10/2005 | Grooms |
| 2005/0283395 A1* | 12/2005 | Lesandrini et al. ............ 705/10 |
| 2005/0289131 A1 | 12/2005 | Aenlle et al. |
| 2006/0004623 A1 | 1/2006 | Jasti |
| 2006/0015369 A1 | 1/2006 | Bachus et al. |
| 2006/0059141 A1 | 3/2006 | Yonezawa |
| 2006/0085408 A1 | 4/2006 | Morsa |
| 2006/0178977 A1 | 8/2006 | Chapelle et al. |
| 2006/0190325 A1 | 8/2006 | Tarsh |
| 2006/0218577 A1 | 9/2006 | Goodman et al. |
| 2006/0235745 A1 | 10/2006 | Yano |
| 2006/0277075 A1 | 12/2006 | Salwan |
| 2006/0293961 A1 | 12/2006 | Eliaa |
| 2007/0005437 A1 | 1/2007 | Stoppelman |
| 2007/0043583 A1 | 2/2007 | Davulcu et al. |
| 2008/0005655 A1* | 1/2008 | Sankaran et al. .......... 715/500.1 |
| 2008/0097843 A1* | 4/2008 | Menon et al. .................. 705/14 |
| 2008/0154724 A1* | 6/2008 | Machlin et al. ................ 705/14 |
| 2008/0243733 A1 | 10/2008 | Black |
| 2008/0250312 A1 | 10/2008 | Curtis |

FOREIGN PATENT DOCUMENTS

| | | |
|---|---|---|
| WO | WO0004464 A1 | 1/2000 |
| WO | WO0004474 A1 | 1/2000 |
| WO | WO0039725 A2 | 7/2000 |
| WO | WO0041119 A1 | 7/2000 |
| WO | WO0079393 A2 | 12/2000 |
| WO | WO0137193 A1 | 5/2001 |
| WO | WO0140898 A2 | 6/2001 |
| WO | WO0141022 A1 | 6/2001 |
| WO | WO0157633 A1 | 8/2001 |
| WO | WO0173642 A1 | 10/2001 |
| WO | WO02069101 A2 | 9/2002 |
| WO | WO2004010265 A2 | 1/2004 |
| WO | WO2004097579 A2 | 11/2004 |
| WO | WO2005020017 A2 | 3/2005 |
| WO | WO2005106744 A2 | 11/2005 |
| WO | WO2006004668 A2 | 1/2006 |

OTHER PUBLICATIONS http://www.thisnext.com/shopcast/ , 2 pages, printed Feb. 24, 2011.

http://www.wists.com/ , 2 pages, printed Feb. 24, 2011.

"Google's Product Recommendation Widget Patent", dated Jan. 20, 2007, printed Feb. 24, 2011, 3 pages via http://www.seobythesea.com/?p=449.

http://www.rateitall.com , printed Feb. 24, 2011, 6 pages.

"ThisNext Launches Shopping Social Network", dated Aug. 2, 2006', printed Feb. 16, 2011, 4 pages, via http://mashable.com/2006/08/21/thisnext-launches-shopping-social-network/.

http://scouta.com/informtion/about , circa Oct. 11, 2007, printed Apr. 1, 2011, 2 pages via http://replay.waybackmachine.org/20071011020119/http://scouta.com/information/about.

"Amazon Adgent 2.0 by Gizmoojo.com", widget last updated Jul. 22, 2008, printed Apr. 1, 2011 via http://eco.netvibes.com/widgets/243232/amazon-adgent-2-0-by-gizmoojo-com.

"Word of Mouth: Advertising 2.0", dated Jan. 4, 2006, printed Apr. 1, 2011, 10 pages via http://www.clickz.com/clickz/column/1697840/word-mouth-advertising.

"Word of Mouth 2.0", circa 2007, printed Apr. 1, 2011, 4 pages via http://www.outofmygord.com/archive/2007/01/29/Word-of-Mouth-2.0.aspx.

"Online Marketing Blog", circa Aug. 14, 2007, printed Apr. 1, 2011, 6 pages via http://replay.waybackmachine.org/20070814153844/http://www.toprankblog.com/category/buzz-marketing/.

"Widget Economy and Implications for Affiliate Marketing", dated Feb. 13, 2007, printed Apr. 1, 2011, 3 pages http://www.costpernews.com/archives/widget-economy-and-implications-for-affiliate-marketing/.

"Kaboodle Launch: Bookmarking + Wiki", dated Oct. 25, 2005, printed Feb. 16, 2011, 3 pages http://techcrunch.com/2005/10/25/kaboodle-launch-bookmarking-wiki/.

http://cj.com/, circa Apr. 6, 2007, printed Apr. 1, 2011, 2 pages via http://replay.waybackmachine.org/20070406180131/http://cj.com/.

"Leading Websites Offer Facebook Beacon for Social Distribution", Dated Nov. 6, 2007, Printed Apr. 1, 2011 http://www.facebook.com/press/releases.php?p=9166.

Non-Final Office Action for U.S. Appl. No. 11/735,913; Office Action Notification Date of Sep. 28, 2010, App. Filing Date Apr. 16, 2007, Inventor Leventhal, Jeffrey (27 pages).

* cited by examiner

METHOD AND SYSTEM FOR RECOMMENDING A PRODUCT OVER A COMPUTER NETWORK

This application is related to co-pending U.S. application Ser. No. 11/735,913 filed on Apr. 16, 2007.

BACKGROUND

Word-of-mouth publicity has long been established as one of the most effective methods of selling products. The Internet version of word-of-mouth publicity is called "viral-marketing" or "viral-advertising", and its use has increased greatly in recent years to the point where it is now widely accepted as being both effective and inexpensive. As used herein, products include goods, services, digital products such as music, software, video, and other digital content such as campaigns, stories, advice, or anything that might be transmitted over the Internet.

Generally, viral marketing refers to the passing on and sharing of information related to a product by people, often via a social network such as an Internet social network. A user may find a particular product on a website and may recommend that product to prospective users by sending an email related to the product, or by posting information, a story, or an opinion about the product on their website or blog. If via email, the existing user may provide the details of the product to the recommended users by forwarding the web-link of the product, or may copy the details of the product in the email. The recipient of the email may further want to recommend the product to one or more users, and may do so either via email, or by posting on their blog, social networking page, or website. This chain of recommendations may continue, thus "virally" promoting the product.

However, in an email/post chain, the recommended product may not get the desired attention. If via email, the email may become very long due to multiple forwardings and may contain other messages or advertisements apart from the details of the product. The recommended user may not necessarily go through the entire email trail in a forwarded email. A recommended user directed to a web-link, may get distracted by other items displayed on the web page. If via posts, the recommendation has many of the same problems, and further may simply be ignored by viewers viewing the website containing the recommendation. Furthermore, no matter the vehicle of recommendation, it is difficult, if not often impossible, to determine the recommendation chain of users who led to an eventual purchase of the product.

Thus there is a need for a method and system for recommending a product over a computer network. There is further a need for a method of selling products online.

SUMMARY

A method for recommending a product over a computer network comprises initiating a recommendation network by creating an active advertisement object of the product on an electronic medium. A recommendation request is received from a user viewing the electronic medium to recommend the product to at least one more user, wherein the user and the at least one more recommended user form a recommendation network. The active advertisement object is recreated on another electronic medium selected by the user. A system comprises an initiating module for initiating a recommendation network by creating an active advertisement object of a product on an electronic medium. A receiving module receives a request form a user viewing the electronic medium. A recreating module recreates the active advertisement object on another electronic medium. A storing module stores the request form the user. A reporting module reports on the recommendation network.

DETAILED DESCRIPTION

As a very brief and general introduction, a product is located on a website, such as a retailer's website, or any other website. On that website is displayed an active advertisement object. A viewer, who is a potential user, viewing the website and desirous of recommending the product makes a recommendation request by clicking on the active advertisement object. By clicking the active advertisement object the viewer becomes a user. The recommendation request may also include supplying the user's email address and an election of the type of electronic medium on which the user would like to make the recommendation (e.g. via email, by posting on the user's website, blog, or social networking page). Then, the active advertisement object is recreated on the user's choice of electronic medium. Other viewers, who are also potential users, viewing the electronic medium may further recommend the product through repeated recommendation requests and recreation of the active advertisement object, creating a network of recommending users. Upon purchase of the product by way of the active advertisement object of one of the recommending users, the recommendation chain from the first recommending user to the last recommending user through which the purchase was made is determined (e.g. through the recommending users' identifying information which is stored when the active advertisement object is recreated). The users in the recommendation chain can be rewarded (e.g. paid a commission) for the successful sale of the product.

Figure 1A:
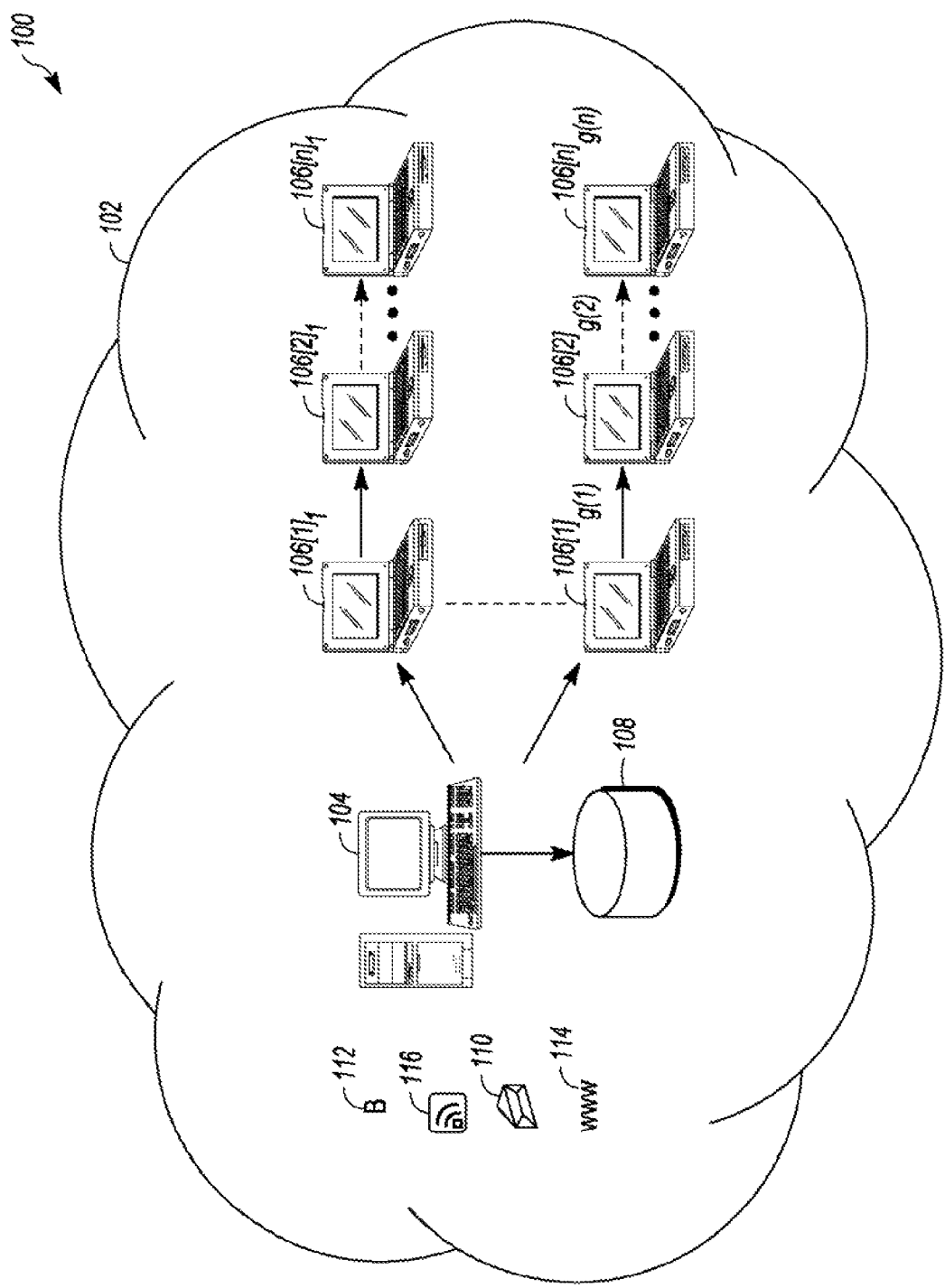
FIG. 1A illustrates an exemplary system for selling products online.

Before disclosing further details and varied forms of the above, it is helpful to briefly describe a few of the drawings. Turning to FIG. 1A, an exemplary system 100 for selling products online is shown. The system 100 includes the computer network 102, a system 104 for recommending product over a computer network (for brevity, also referred to herein as a server 104), and a plurality of users $106[1 \leq i \leq n]_{g(i)}$ belonging to a plurality of generations. There are $1 \leq i \leq n$ generations and g(i) users in each generation i. The server 104 may be in communication with a database 108, or may include the database 108. A user may recommend a product to one or more viewers, who themselves can become users 106, using an active advertisement object, which will be described in detail. The user and the recommended users form a recommendation network or chain. Specifically, all users that recommend a product to other users form a recommendation network, and the recommendation chain is the subset of users that lead to a purchase of a product. This will become clear below.

Figure 1B:
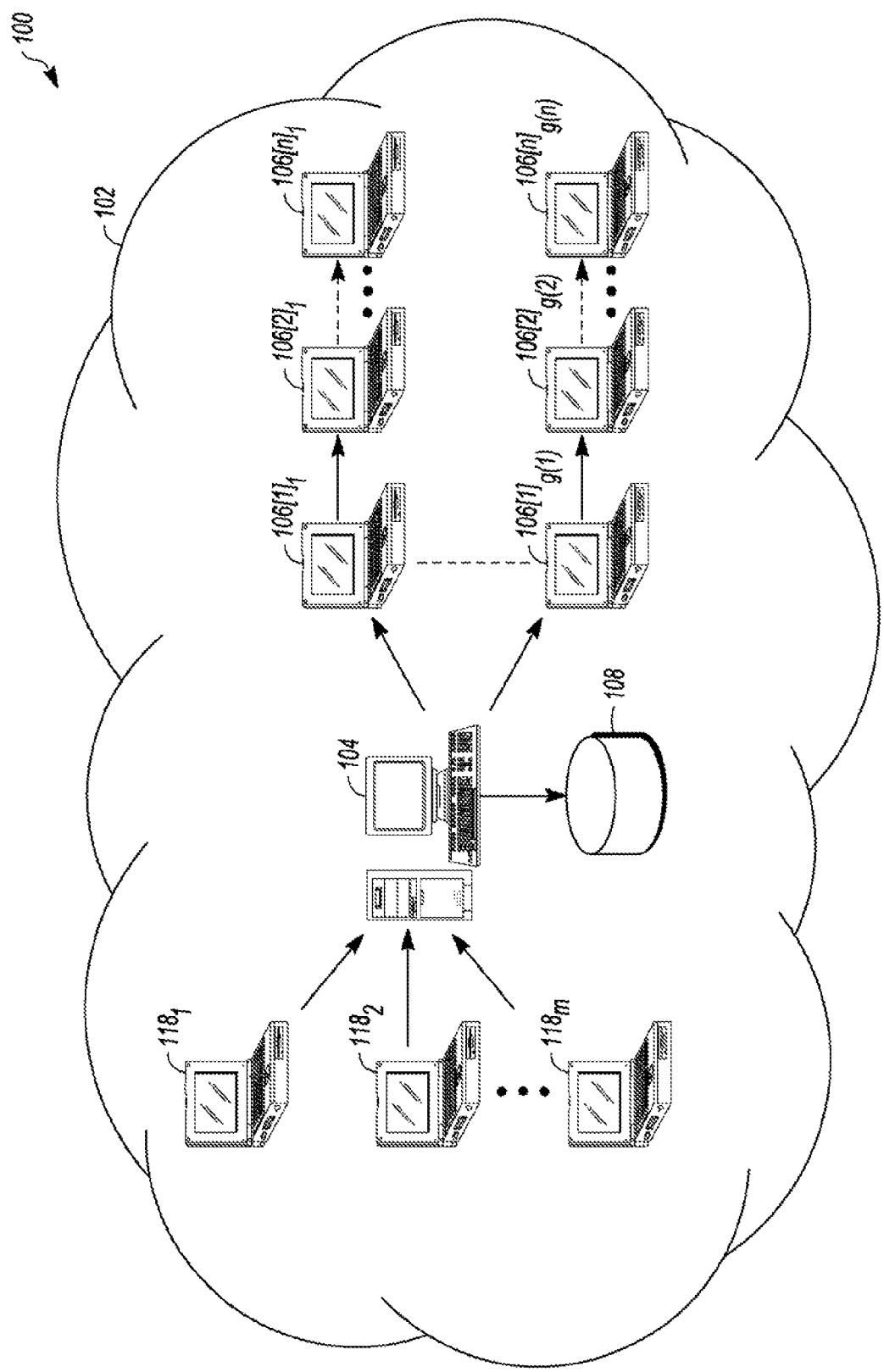
FIG. 1B illustrates an exemplary system for selling products online showing a plurality of sellers.

FIG. 1B illustrates an exemplary system 100 for recommending selling products online 102. The system 100 includes the computer network 102, the server 104, the plurality of users $106[1 \leq i \leq n]_{g(i)}$ belonging to a plurality of generations, and a plurality of sellers $118_{1-m}$. The seller 118 is a person or an entity such as a manufacturer, a dealer, a retailer, and the like who wants to sell a product.

Figure 1C:
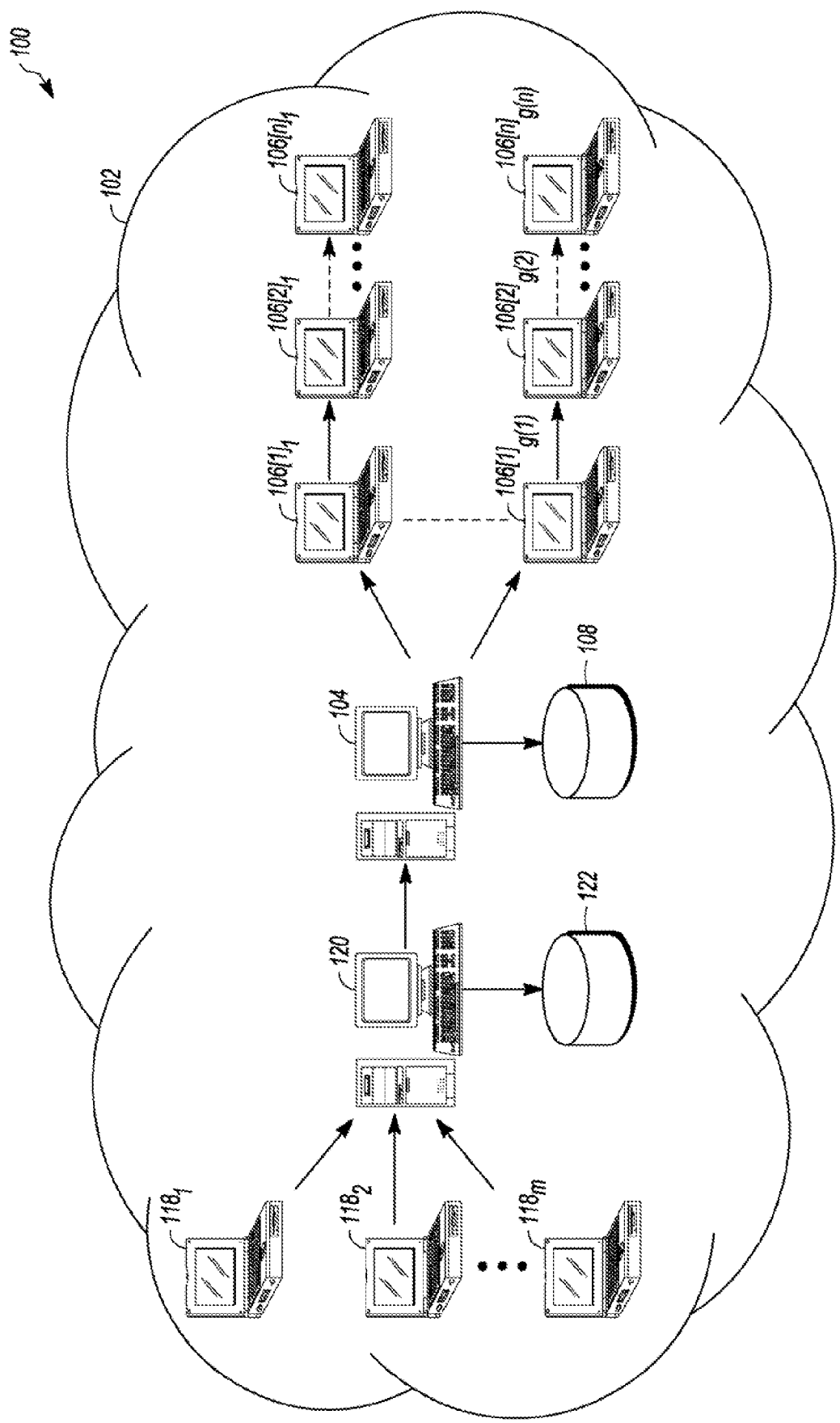
FIG. 1C illustrates exemplary system for selling products online showing a plurality of sellers and third party.

FIG. 1C illustrates another exemplary system 100 selling products online 102. The system 100 includes the computer network 102, the server 104, the plurality of users $106[1 \leq i \leq n]_{g(i)}$ belonging to a plurality of generations, a plurality of sellers $118_{i-m}$, and one or more third party servers 120. The system 100 may be compatible with the well known merchant-affiliate systems and methods in wide use among Internet merchants and advertisers. These prior art systems and methods are referred to herein, generically as an affiliate network. A database 122 in communication with or part of the third party server 120 stores affiliate network data such as merchants, affiliate, advertising campaigns, products, and the like.

Figure 1D:
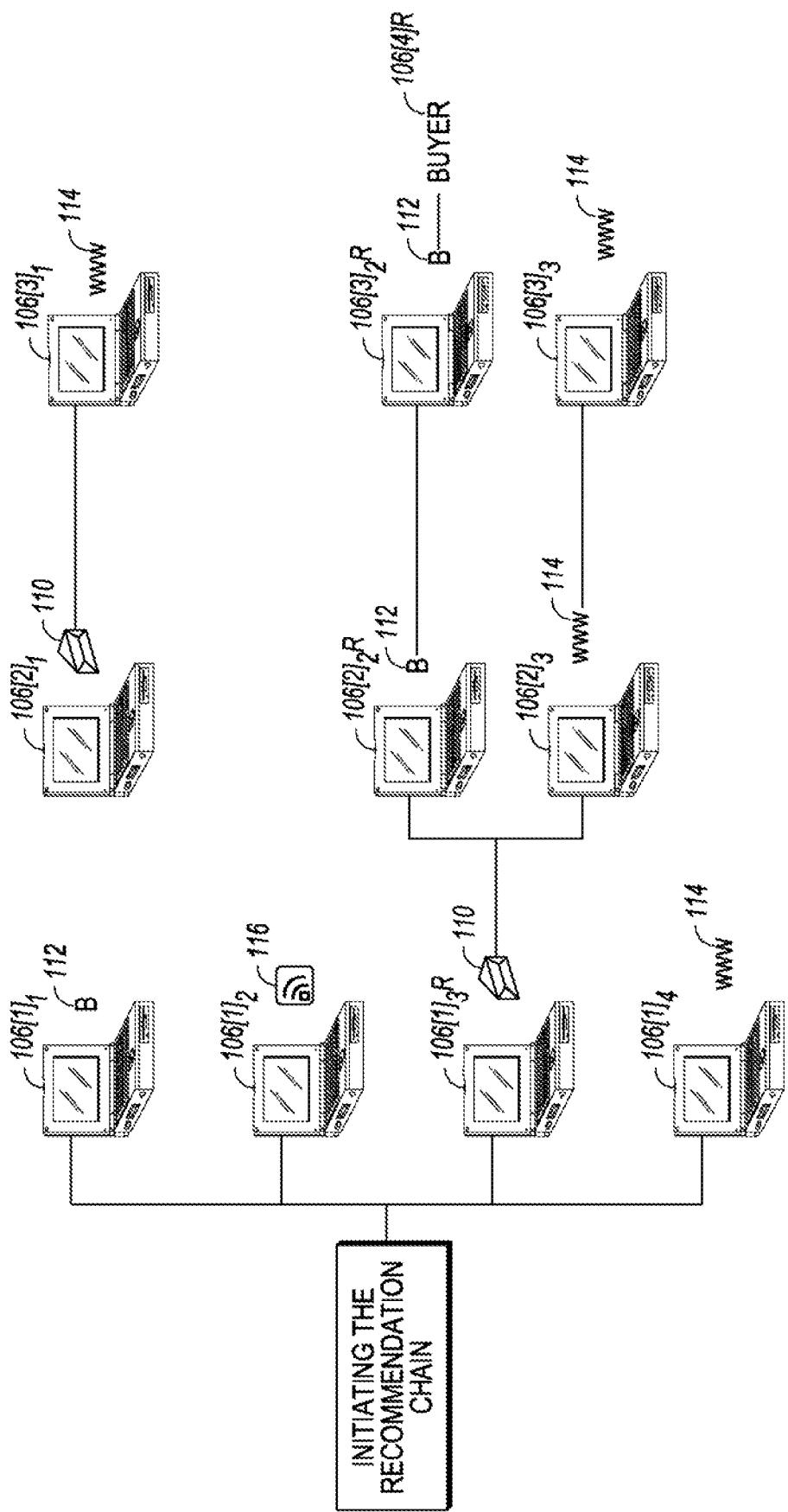
FIG. 1D illustrates an exemplary recommendation chain.

FIG. 1D illustrates an exemplary recommendation chain that includes a number of users 106 in various generations. Users 106[1] represent a first generation of the recommendation chain. Users 106[2], 106[3], and 106[4] represent second, third and fourth generation of the recommendation chain respectively. FIG. 1D also illustrates a user $106[4]_1R$ who purchases the product. The recommendation chain that led to the purchase of the product includes users $106[3]_2R$, $106[2]_2R$, and $106[1]_3R$. The recommendation chain may be tracked and the users $106[3]_2R$, $106[2]_2R$ and $106[1]_3R$ may be rewarded.

Examining FIG. 1A in greater detail, an exemplary system 100 for selling products online is shown. The system 100 includes the computer network 102, the server 104, and the plurality of users $106[1 \leq i \leq n]_{g(i)}$ belonging to a plurality of generations. Note that a generation may comprise one user, or may comprise many users.

In the first generation, the users recommending the product directly from server 104 (which could be thought of as generation zero), includes users $106[1]_1$, $106[1]_2$ (understood from the notation shown in the FIG. 1A but not shown), through $106[1]_{g(1)}$, where g(1)=the total number of users in first generation. So, represented symbolically, the first generation=$\{106[1]_{g(x)}: g(x)=x \text{ for } 1 \leq x \leq g(1)\}$.

The second generation, the users recommending the product using the electronic medium provided by any of the users of the first generation, include users $106[2_1]$, through $106[2]_{g(2)}$, where g(2)=the total number of users in the second generation. So, represented symbolically, the second generation=$\{106[2]_{g(x)}: g(x)=x \text{ for } 1 \leq x \leq g(2)\}$.

And the $n^{th}$ generation, the users recommending the product using the electronic medium provided by any of the users of the $n^{th}$-1 generation include users $106[n]_1$ through $106[n]_{g(n)}$, where g(n)=the total number of users in the $n^{th}$ generation. So, represented symbolically, the $n^{th}$ generation=$\{106[n]_{g(x)}: g(x)=x \text{ for } 1 \leq x \leq g(n)\}$.

It is understood that there may be any number of generations and any number of users in a generation. The number of generations and the number users in each generation may be dynamic.

The server 104 and user computing devices used by the users 106 communicate with each other through the computer network 102. The user computing devices include, without limitation, computers, Personal Digital Assistants (PDAs), mobile devices, handheld devices, and any other device compatible with the computer network 102. The one or more computing devices and server are in communication with each other by way of the computer network 102. The computer network 102 may comprise a telecommunication system for the purpose of communicating and sharing resources. The computer network 102 may comprise one or more of, an Internet, a Local Area Network (LAN), a Wide Area Network (WAN), or any other network capable of communicating digital data. The computer network 102 may be wired, wireless, or a combination of wired and wireless.

The server 104 serves an active advertisement object related to the product. The active advertising object may comprise a widget. The widget is an interface element that a viewer or user may interact with. The active advertising object comprises a user interface that can be replicated on a user's request. The active advertising object may include, without limitation, a display including an advertisement which may include for example, a company logo, a price of the product, an image of the product, a commercial message related to the product, and any other text, graphics, video, sound, or multimedia elements that are used in advertisements. The active advertising object may also comprise buttons for a user to click on or select, and forms into which the user may enter information. The active advertising object comprises code that when executed on a computer causes the active advertising object to be displayed (e.g. on a web browser) on an Internet connected computing device 104. It is understood by those having ordinary skill in the art that many different types of code are possible for example, without limitation, html code, flash code, javascript code, and the like.

The server 104 may further be in communication with database 108 to store one or more user activities. The user activities includes, without limitation, recommendation requests made by the users, and purchase requests made by the users. The database 108 is a logical unit of storage and may be formed by storage of a portion of a physical device, by storage of an entire physical device, or by storage of multiple physical devices combined together physically or virtually.

A viewer, who is a potential user 106[1], viewing an electronic medium such as a website, discovers the active advertisement object displayed on the website served by server 104. In this case, since the active advertisement object is already present, the recommendation chain has already been initiated. Merely accept this for now, as initiation will be disclosed below.

Figure 5:
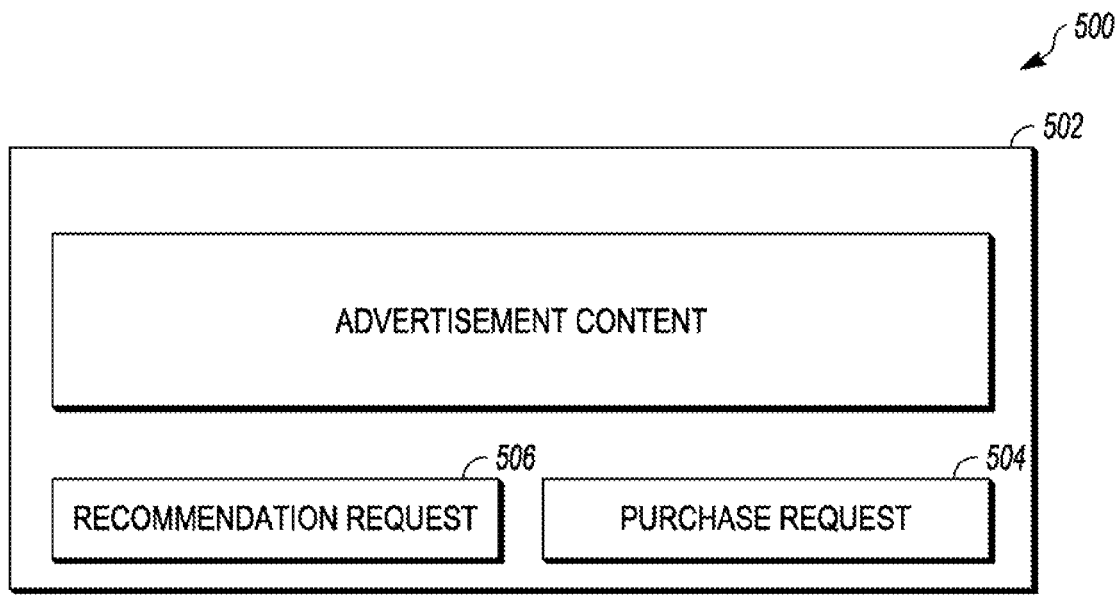
FIGS. 5-8 are exemplary interfaces of an active advertisement object.

The website may be the website of a retailer, the website of a recommendation site, or any other website. On that website, for example, a description and other details of the product may be displayed, as those skilled in the art will appreciate. In addition to, or instead of that, the active advertisement object is displayed. One example of an active advertisement object is shown in FIG. 5. Without limitation, FIG. 5 shows an exemplary interface 500 of an active advertisement object that a user receives with the electronic medium. The user interface includes any of the following: an advertisement content section 502, a purchase request button 504, and a recommendation request button 506. The advertisement content section 502 may include an advertisement and details of the product.

The interface 500 provides an option to buy the product by clicking on the purchase request button 504. The user can recommend the product by clicking on the recommendation request button 506. Other buttons in addition to instead of the purchase request and the recommendation request buttons, or other interface elements such as links, are possible.

As mentioned above, a user is a viewer who has recommended a product. As such, any viewer is potentially a user, the only distinction between a viewer and a user being that a viewer has not yet recommended the product. Thus, herein, when the term "user" is mentioned it is understood that the "user" is a viewer who has already made a recommendation request, or is a viewer who is inevitably going to make a recommendation request.

So, referring back to FIG. 1A, a user 106[1] may recommend the product to one ore more viewers. For example a user 106[1]$_1$ recommends the product by recreating the active advertisement object on an electronic medium so that one or more of the viewers (who may become users 106[2]) can view it. The user 106[1] uses the active advertisement object to send a recommendation request to the server 104 to propagate a recommendation chain, for example by clicking on the recommendation request button (506 of FIG. 5). By making the recommendation request and propagating the recommendation chain, the users 106[1] are members of a first generation of the recommendation chain.

Figure 6:
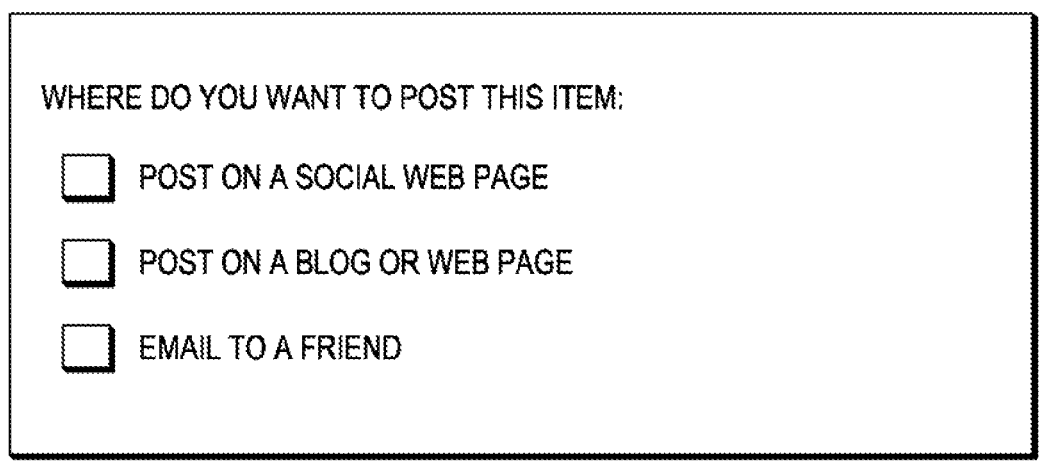

The users 106[1] of the first generation have recommended the product to viewers. The viewers, upon making a recommendation request through an electronic medium, are the users 106[2] shown in FIG. 1A. The recommendation request includes a choice of an electronic medium on which each user wants to recreate the active advertisement object. Examples of the electronic medium include, without limitation, an email 110, a blog 112, a webpage 114, and a feed such as an Extensible Markup Language (XML) format like an RSS feed 116. Other examples of electronic medium include a short message service (SMS), or any kind of text message. FIG. 6 shows one exemplary interface 600 of the active advertisement object that gives the user a choice of electronic medium.

To facilitate the users 106[1] in providing the active advertisement object of the product on a social web page, the server 104 may provide a link or code compatible with one or more of a social websites' standards. This code can be used to publish the active advertisements on the user's social webpage. Similarly, the server may also provide code (for example, via email, or via the active advertisement object or webpage or pop-up) that can be used by the user to insert on his website or blog. For example, the code may simply be copied and pasted by the user on the user's social website, blog, or website. Or, the user may be provided an interface upon selection of the electronic medium that automatically creates the active advertisement object on his social webpage or any other electronic medium by way of any compatible API.

Figure 7:
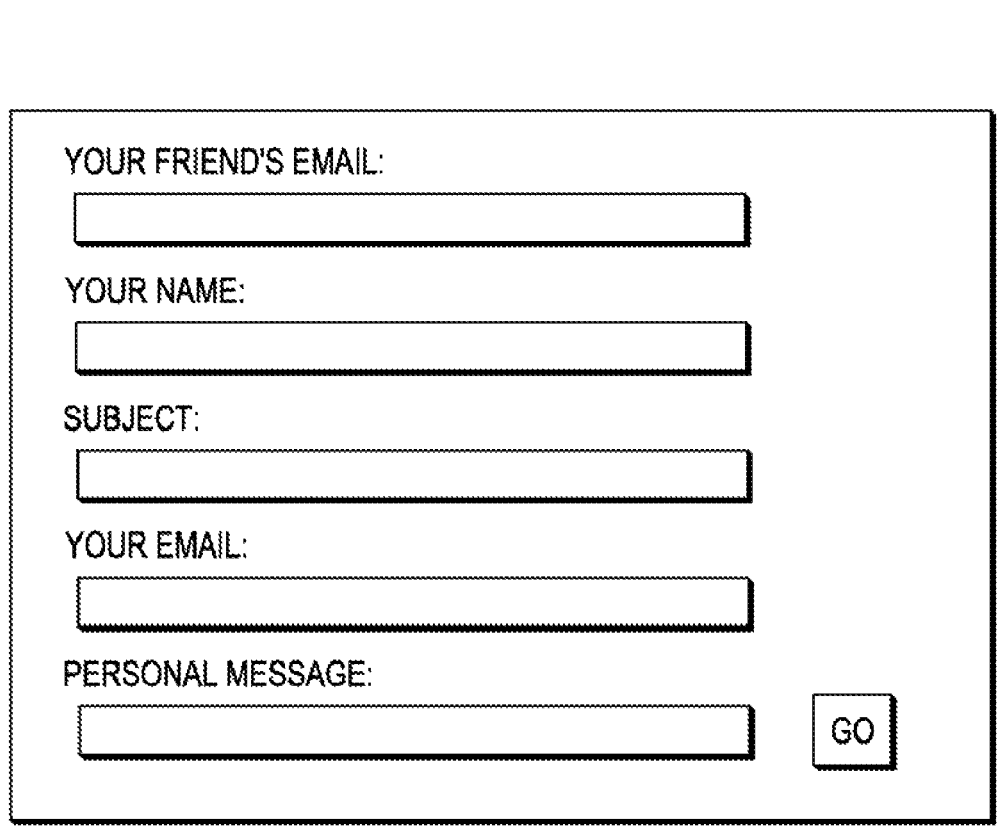

For sending the recommendation through email the user is provided an interface to enter the email addresses of the viewer, who is potentially a next generation user, to which he wishes to send the recommendation, in this example, any of the users 106[2]. FIG. 7 shows an exemplary interface 700 of an active advertisement object when selecting "email" as the electronic medium. This allows the user to specify his name and his friend's email address, among other things. Further, the user interface 700 gives the user an option to add a subject line and a personal message for his friend. Those skilled in the art will appreciate that this, and in fact all of the interfaces, are shown by way of example, and that many variations are possible.

Figure 8:
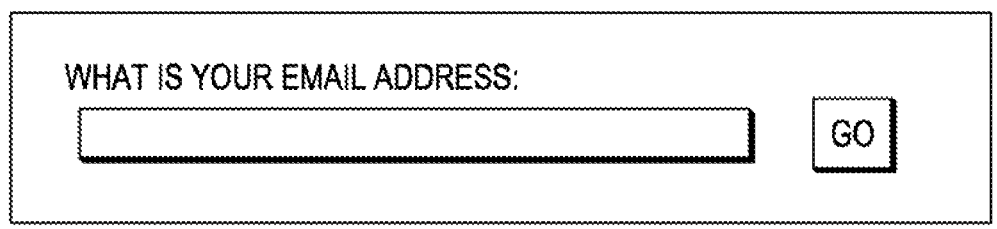

No matter the specifics of the electronic medium of choice, the user also supplies, through the active advertisement object, his email or other identifying information. For example, FIG. 8 shows an exemplary interface 800 of an active advertisement object that a user receives on the screen after the user sends the recommendation request. The user is asked to enter his email address. The email address is stored and used to track the recommendation and may be used to communicate with the user and reward him in the event the product is purchased as a result, at least in part, of his recommendation.

So, summarizing the above several paragraphs, in response to the recommendation request, the server 104 recreates the active advertising object on the electronic medium provided by the user 106[1]$_{i \, for \, 1 \leq i \leq g(1)}$. In recreating, the server 104 creates code which is embedded in the electronic medium to recreate the active advertisement object, and stores identifying information of the user making the recommendation request. The recreated active advertisement object is linked to the user making the recommendation request, and thus all requests are traceable.

Any viewer viewing the electronic medium specified by any of the users 106[1] may become a user 106[2]. The user 106[2] may take one or more actions including, without limitation, ignoring the active advertising object, recommending the product, and purchasing the product. The user 106[2] may use the active advertisement object to recommend the product to other viewers as described above for the first generation 106[1]. The user 106[2] sends a recommendation request to be added to the recommendation network. The user 106[2] becomes a member of a second generation of the of the recommendation network. When the user 106[2], or any user for that matter, sends a recommendation request and recreates the active advertisement object, the server 104 stores the recommendation request in the database 108. The recommendation request includes, for example, the email address of the user 106[2] as discussed above. The recommendation request, no matter what generation the user may belong to, may further include, without limitation, time details, recommendation details, electronic medium details, and an Internet Protocol (IP) address. The time details include the time when the active advertisement object is provided on the electronic medium. The recommendation details may include other information such as the user's feedback.

Additional viewers may further recommend the product as described above, creating additional generations 106[n]. The recommendation chain propagates as one user recommends the product to another user through the active advertising object. The user recommending the product belongs to an earlier, or older, generation than that of the recommended user, who is a later, or younger, generation. A user may recommend the product to any number of viewers who may become later generation users by further recommending the product.

As already mentioned, each user is identifiable and their place in the recommendation network determinable through the user's email or other identifying information, which is stored by the server upon recommendation and recreation. Note, that depending on the specifics of an implementation, the identifying information may be stored during recommendation, after recommendation, during recreation, after recreation, or any combination thereof. The exact moment when storing occurs is in no way limiting.

Consider an example in which a user 106[1] may be an owner of a social web page. The user 106[1] sends a recommendation request to the server 104. In response, the server 104 creates an active advertisement object on the social web page owned or otherwise controlled by the user 106[1]. A viewer viewing the social web page finds the active advertisement object on the screen of his computing device. The viewer, who is about to be a user 106[2] may take one or more actions including, without limitation, ignore the active advertising object, further recommend the product, or purchase the product. If the user 106[2] decides to purchase the product, he sends a purchase request using the active advertisement object. If the user 106[2] decides to recommend the product to other users, he sends a recommendation request using the active advertisement object. In response to the recommendation request, the active advertising object is recreated on a blog, or other electronic medium, of the user 106[2]. Thereby, the user 106[2] becomes a member of second generation of the recommendation chain. The recommendation chain propagates as the users recommend the product to later generation users.

Elaborating on this, FIG. 1D illustrates an exemplary recommendation chain. Users 106[1] represent a first generation of the recommendation chain. Users 106[2], 106[3], and 106[4] represent second, third and fourth generation of the recommendation chain respectively. A user recommends a product to viewers using an electronic medium such as a blog 112, a feed 116, an email 110, or any type of webpage 114. The viewers are termed recommended users if the viewers recommend or buy the product. Keep in mind, when a recommended user purchases the product, all the earlier generation users in the recommendation chain can be rewarded. For simplicity, a recommended user who purchases the product is termed as a buyer. Representing the recommendation chain symbolically, the recommendation chain=$\{106[x]_y$:
$1 \leq x \leq$ generation_of_buyer; and $y$=the $z$ of $106[x]_z$ connecting $106[x]_z$ to $106$[generation_of_buyer]$\}$.

Consider the example in which a user 106[4]$_1$R is the buyer. The user 106[4]$_1$R receives a recommendation from a user 106[3]$_2$R through the active advertisement object displayed on a blog 112. Similarly, the user 106[3]$_2$R receives a recommendation from a user 106[2]$_2$R through the active advertisement object displayed on a blog 112, and the user 106[2]$_2$R receives a recommendation through the active advertisement object displayed on an email 110 sent by a user 106[1]$_3$R. Thus, the users 106[3]$_2$R, 106[2]$_2$R, and 106[1]$_3$R in the recommendation chain are rewarded, or at the very least, identifiable, and capable of being rewarded. That is, the recommendation chain=$\{106[1]_3, 106[2]_2, 106[3]_2\}$.

While FIG. 1D shows four generations, there may be any number of generations. Furthermore, a buyer may be a member of any generation. For example, a buyer 106[3]$_3$ may purchase a product through an active advertisement object on a website 114 of user 106[2]$_3$. The buyer is considered to be a member of the generation following the generation of the user from whom he received the recommendation. So, in this example, the user who recommended the product belongs to the second generation and the buyer belongs to the third generation. Thus, in this example, the recommendation chain that includes the users that can or will be rewarded is, the recommendation chain=$\{106[1]_3, 106[2]_3\}$.

The recommendation chain is tracked by storing the recommendation requests and the purchase requests in the database 108. By storing, it should be understood by now that that includes storing identifying information. The reward may include one or more types of rewards such as an acknowledgement (via email or other means), or a reward with a monetary value. If the reward has a monetary value it may be divided among the recommendation chain equally, in relation to each user's generation, or in any other linear or non-linear way. The reward may include a commission which may be a percentage of a profit earned by the owner of the product, a percentage of a sale price, or some other percentage. The reward may also vary depending on the number of users in the recommendation chain. The reward may include points, charitable donations, gift cards, or any other reward.

Now, referring to FIG. 1B, an exemplary system 100 for selling products online is shown. The system 100 includes the computer network 102, the server 104, the plurality of users 106$[1 \leq i \leq n]_{g(i)}$ belonging to a plurality of generations, and a plurality of sellers 118$_{1-m}$. The sellers 118 comprise entities such as a manufacturer, a dealer, a retailer, and the like who want to sell a product. FIG. 1B explicitly illustrates the sellers of products as was already described in detail with reference to FIG. 1A.

In this exemplary system a service provider associated with the server 104 may receive a promotional object related to the product from any of the sellers 118, or by way of any user 106. The service provider may receive a promotional object related to the product by searching the Internet, receiving feeds, and receiving direct recommendations. The server 104 creates the active advertisement object on the website served by the server 104 using the promotional object. For example the website, may be a product recommendation website. In this way, the recommendation chain is initiated, that is the first active advertisement object is created. The promotional object may include, without limitation, an advertisement, a company logo, a price of the product, an image of the product, a commercial message related to the product, or information pertaining to anything that is to be promoted.

The server 104 initiates a recommendation chain by creating the seminal active advertisement object on an electronic medium. This initiation of the active advertisement object may be made by a user 106[1] in which case the user is a member of the first generation of the recommendation network. However, it is also noted that user may not be the one providing the initiation request to form the seminal active advertisement object; alternatively, the service provider may independently initiate it. This may be done through automated, unmonitored means such as web crawling, and may be done in a monitored way, for example through the use of editors who find and filter appropriate products. In yet another alternative, the sellers 118 themselves may initiate to create the active advertisement object of the product. And, as will be described, a third party, who is not a seller, may initiate.

No matter who initiates, the server 104 propagates the recommendation chain when one user recommends the product to another user using the active advertising object, as described above. The server 104 stores all user activities in the database 108 in communication with or part of the server 104. The user activities include, without limitation, the recommendation request made by the users 106, and the purchase request made by the users 106.

Upon a purchase, the service provider receives a payment such as a commission from the seller 118. The payment may be a fixed payment or may vary according to various sales and profit metrics. The payment may be a percentage of the sale price of the product. The payment may vary with the number of the active advertisement objects posted or propagated. The payment may vary with the position and location of the active advertisement object on the website. The payment may comprise a subscription fee for a specified period of time. The payment may be a flat fee. It is appreciated that there are a multitude of ways to compute and pay commissions.

The service provider may further distribute the commission among any of the users 106 in the recommendation chain that led to the purchase, thereby encouraging additional users to recommend products. The reward may include, without limitation, e-money, redeemable points, credits, discounts, a check, a gift voucher, a charitable donation, and the like.

Since the service provider is able to track the propagation of all recommendations, the service provider is further able to provide a reporting function to the seller 118. The report may provide a summary of all user activities. The report may comprise a visual display, for example something akin what is shown in FIG. 1D. The reports may include tables and other reports showing recommending activities of all types, analyzed by users, user demographics, products, electronic medium, and the like. The seller 118 may use the report in designing and implementing more effective marketing campaigns. The seller 118 may use the summary to monitor, analyze and track the recommendation chains. The service provider may charge for providing the reporting functions to the seller 118.

FIG. 1C illustrates another exemplary system 100 for selling products online. The system 100 includes the computer network 102, the server 104, the plurality of users 106 belonging to a plurality of generations, a plurality of sellers 118, and one or more third party servers 120. The system 100 may be compatible with well known affiliate networks. As a matter of background, a database 122 in communication with or part of the third party server 120 stores affiliate network data such as merchants, affiliate, advertising campaigns, products, and the like.

In this exemplary system a service provider associated with the server 104 may receive a promotional object related to the product from any of the sellers 118, by way of a third party associated with the third party server 120, by way of any user 106, or by way of the service provider 104. The service provider may be an affiliate registered with the third party and thus, in addition to all that is described above, can operated independently of the sellers 118 to propagate recommendation chains while still being paid for advertising and successful product sales of seller's products by the third party.

In the exemplary system if FIG. 1C, a service provider associated with the server 104 may receive a promotional object related to the product from any of the sellers 118, by way of any user 106, by way of the service provider (e.g. by searching over Internet, receiving feeds, and receiving direct recommendations), or by way of a third party associated with third party server 120. The recommendation chain is initiated when the seminal active advertisement object is created using the promotional object. For example, the server 104 initiates a recommendation chain by creating the active advertisement object on an electronic medium upon an initiation request made by a user 106[1]. As should be understood by now, a user may not be the one providing the initiation request. Alternatively, the service provider may independently initiate it through and may utilize editors to find appropriate products. In another alternative, the sellers 118 or the third party itself may initiate to create the active advertisement object of the product.

No matter who initiates, the server 104 propagates the recommendation network when one user recommends the product to another user using the active advertising object, as described above. The server 104 stores all user requests in the database 108 in communication with the server 104. The user requests include, without limitation, the recommendation request made by the users 106, and the purchase request made by the users 106.

The service provider 104 receives the payment from the third party upon the purchase of product by a user in the recommendation chain. It is well understood by those having ordinary skill in the art that sellers 118 and third parties may have various agreements by which sellers 118 compensate the third parties for advertising services. Upon sale, and as described above, the service provider may further distribute the commission to the users 106 in the form of rewards for recommending the product. Rewards were disclosed above. Also, disclosed above, the service provider may generate reports.

So, it should now be evident that any user 106 can initiate and recommend products that they find, for example on the Internet, and those users can be tracked and paid by the service provider. The users 106 do not have to be aware of or enter into any agreements with sellers 118. This is so because the service provider interfaces with one or more third parties who interface with a plurality of sellers, or the service provider interfaces directly with one more sellers. In this way, the affiliate network is expanded, the sellers sell or promote more products in a more targeted way, and the users are able to be compensated for their "word-of-mouth" product endorsements.

Figure 2:
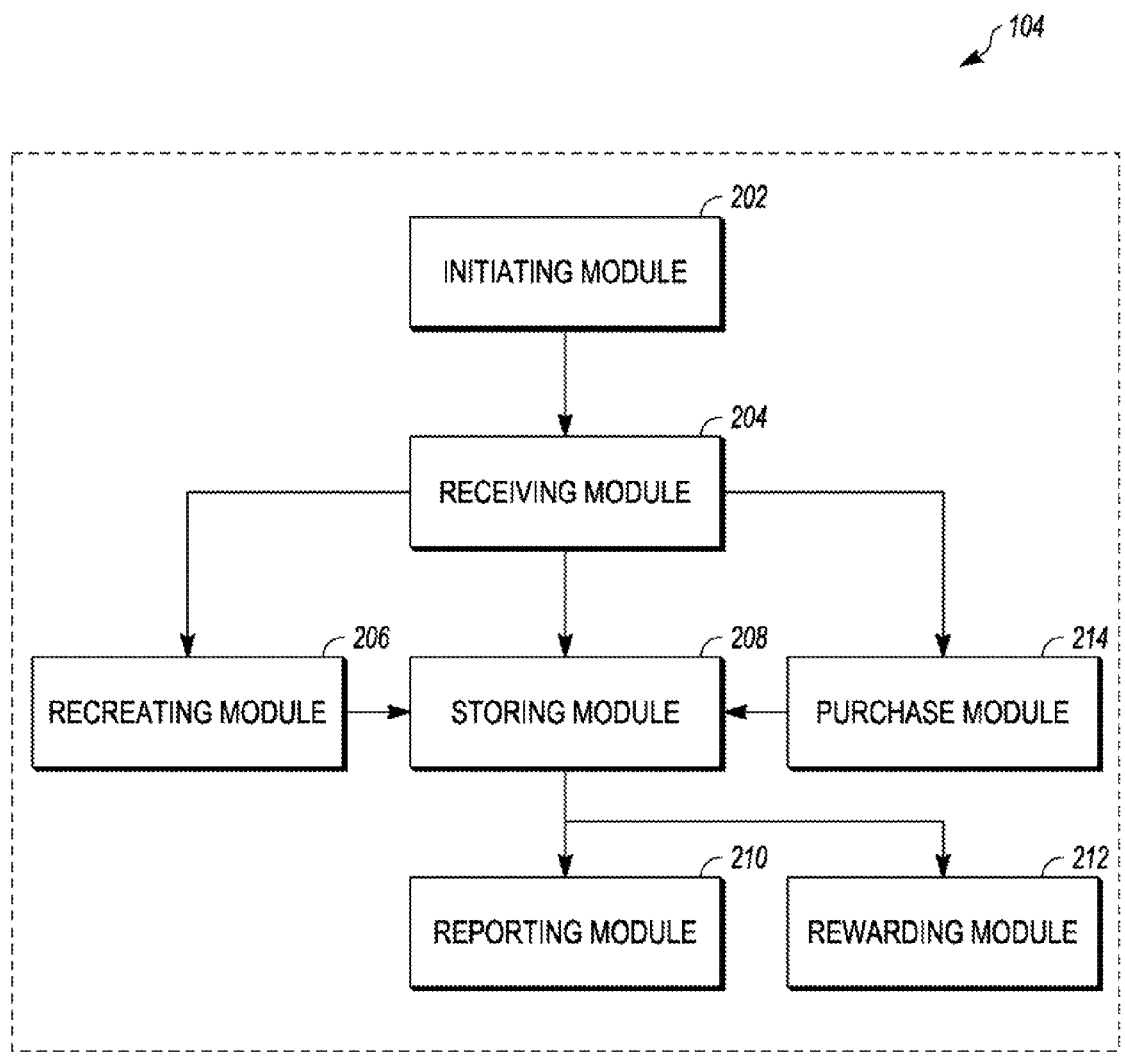
FIG. 2 is a block diagram illustrating a system for recommending products over a computer network.
Figure 3:
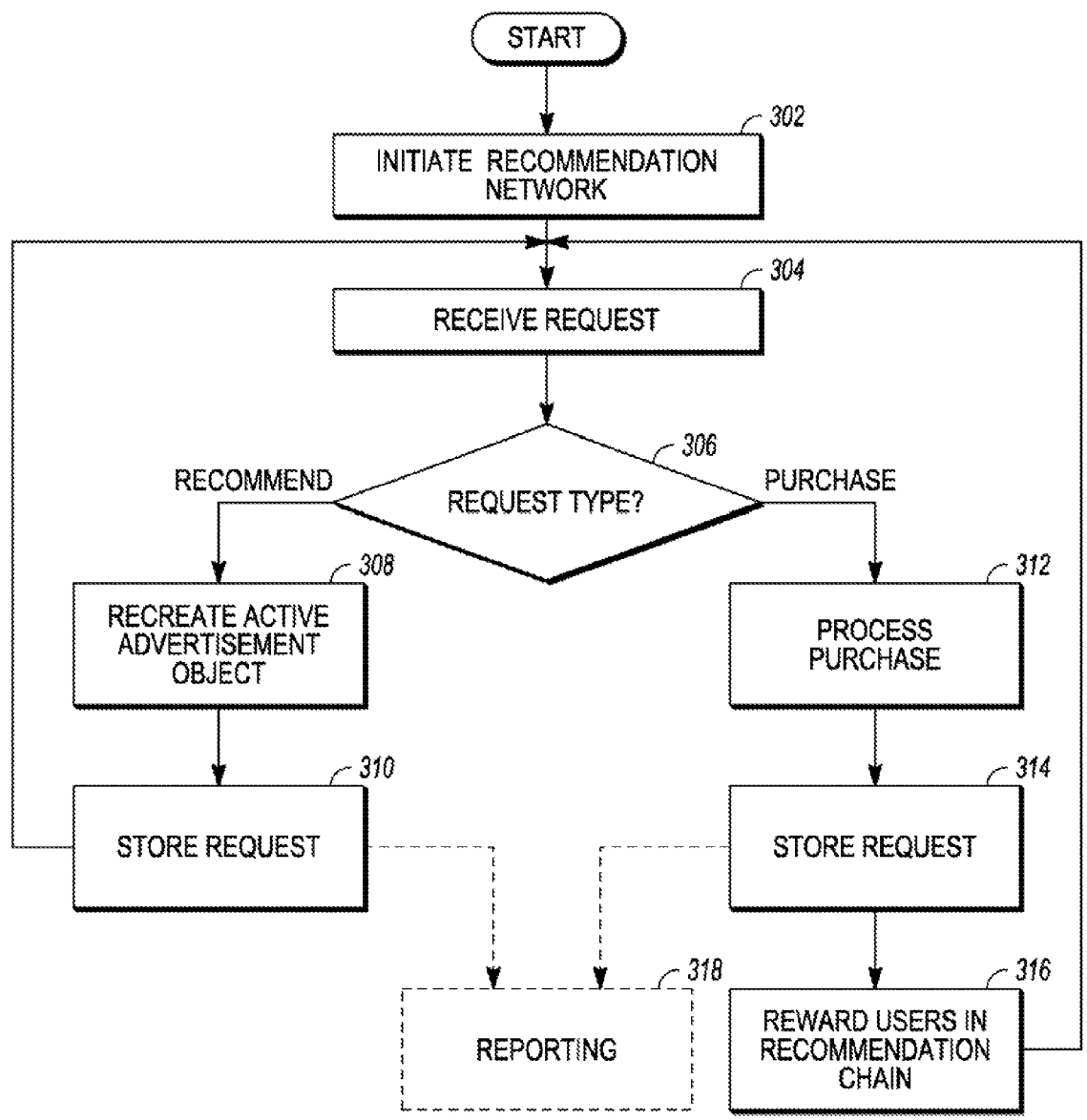
FIG. 3 is a method for recommending a product over a computer network.

With the above disclosure in mind, FIG. 3 illustrates a flowchart of a method for recommending a product over the computer network 102. Reference is also made to FIG. 2 which shows a block diagram of a system 104 for recommending products over a computer network. Descriptions are provided, but the above disclosure should be referenced where necessary since repetition of already established concepts, systems, and methods has been minimized.

At step 302, a recommendation network is initiated by creating an active advertisement object of the product on an electronic medium. As disclosed above, the recommendation chain may be initiated by a user, by a service provider, a seller, or by a third party. The initiating module 202 creates the advertisement object on the electronic medium.

Once initiated, at step 304, a request is received from a user viewing the electronic medium. The request may comprise a recommendation request or may comprise a purchase request (step 306). The receiving module 204 receives this request. It is appreciated that while the purchase request is mostly disclosed herein as a request for a monetary purchase of a product, that this request does not necessarily comprise a monetary purchase.

If the request is a recommendation request (step 306, "RECOMMEND"), the active advertisement object is recreated (step 308) and the request is stored (step 3 10). The recreating module 206 recreates the active advertisement object, and the storing module 208 stores the request. In storing the request, as disclosed above, identifying information such as the email address of the user is stored. As should be understood by now, the identifying information is used in determining the recommendation chain, rewarding, and reporting. It is understood that while the recreating 308 and storing 310 are shown as two distinct steps, that these steps, depending on the specific implementation, may be conducted in different orders, in parallel, and the storing 310 may be considered part of the recreating 308.

Going back to step 304 where a request is received, if the request is a purchase request (step 306, "PURCHASE"), the purchase is processed (step 312) which may include any of an array of well known prior art on-line purchasing means and signaling between sellers and any third parties. The purchase module 214 processes the purchase.

Once purchased, the request is stored (step 314), and the users in the recommendation chain are rewarded (step 316). The storing module 208 stores the request, and the rewarding module 212 rewards the users in the recommendation chain.

As disclosed above, a reporting module 210 (and step 318) creates and provides reports on the recommendation network.

The steps of 304, 308, and 310 are repeated for each recommendation, as the recommendation network grows. And, the steps 304, 312, 314 and 316 are repeated for each purchase. Step 302 and any following steps are repeated for each new recommendation chain, that is, for example, each new product being recommended.

Figure 4:
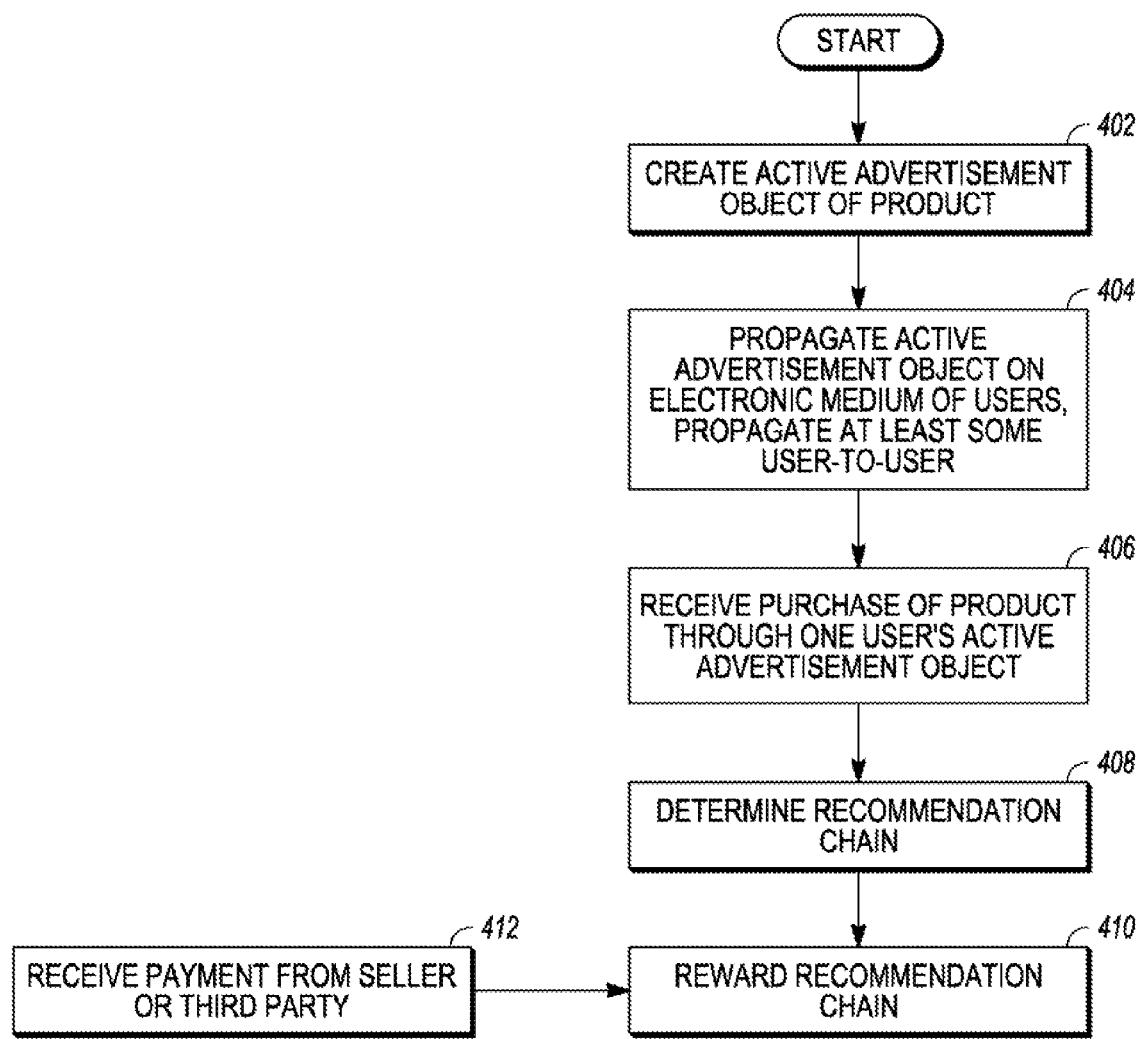
FIG. 4 is a method of selling products online.

Now, turning to FIG. 4, a method of selling a product online is shown. With reference to the above disclosure, an active advertisement object is created for a product for sale by a seller (step 402). Next, the active advertisement object is propagated on an electronic medium of a plurality users (step 404). As described, in propagating, the active advertisement object is displayed on the electronic medium, and identifying information is stored for each of the plurality of users. At least some of the propagation occurs from user to user. During or after propagation, a purchase is received of the product (step 406). The purchase occurs through one of the plurality of users' active advertisement object displayed on his electronic medium. After purchase, a recommendation chain is determined by identifying which of the plurality of users in the recommendation network led to the purchase (step 408). This has been extensively disclosed. Next, the recommendation chain may be rewarded (step 410). The rewarding may comprise receiving a payment from the seller (step 412) of the purchased product, and distributing at least some of the payment to the users in the recommendation chain. The rewarding may also comprise receiving a payment from a third party (step 412) who is not the seller, and distributing at least some of the payment to the users in the recommendation chain. In distributing at least some of the payment, it is understood that that distribution may include any of the rewards disclosed above, including non-monetary rewards.

The foregoing detailed description has set forth a few of the many forms that this invention can take. It is intended that the foregoing detailed description be understood as an illustration of selected forms that the invention can take and not as a limitation to the definition of the invention. It is only the following claims, including all equivalents that are intended to define the scope of this invention.

What is claimed is:

1. A method for recommending a product over a computer network comprising:
   initiating a recommendation network by creating an active advertisement object on an electronic medium, wherein the active advertisement object comprises information representing a product;
   receiving a recommendation request from a user viewing the electronic medium to recommend the product to at least one more user, wherein the user and the at least one more recommended user form a recommendation network;
   recreating the active advertisement object on another electronic medium, wherein the step of recreating comprises modifying an electronic display of a user computing device in communication with the computer network such that at least some information representing the product is visually depicted on the display;
   repeating said receiving a recommendation request and said recreating;
   receiving a purchase request;
   determining a recommendation chain of users in the recommendation network leading to the purchase request; and
   rewarding at least one user of the recommendation chain.

2. The method of claim 1 further comprising creating a report representing information useful for a seller of the product.

3. A method for recommending a product over a computer network comprising:
   initiating a recommendation network by creating an active advertisement object on an electronic medium, wherein the active advertisement object comprises information representing a product;
   receiving a recommendation request from a user viewing the electronic medium to recommend the product to at least one more user, wherein the user and the at least one more recommended user form a recommendation network; and
   recreating the active advertisement object on another user-selected electronic medium wherein the step of recreating comprises modifying an electronic display of a user computing device in communication with the computer network such that at least some information representing the product is visually depicted on the display.

4. The method of claim 3 further comprising repeating said receiving and said recreating.

5. The method of claim 3 wherein said initiating comprises publishing the active advertisement.

6. The method of claim 3 wherein said receiving the recommendation request comprises receiving the recommendation request by way of the active advertisement object.

7. The method of claim 3 wherein the step of creating or the step of recreating an active advertisement object comprises creating at least one of an advertisement, a button, a form, a link, a graphical icon, a post on a website, and a message on a social networking site.

8. The method of claim 3 wherein the creating an active advertisement object comprises creating a widget.

9. The method of claim 3 wherein said recreating further comprises storing the recommendation request in a database.

10. The method of claim 9 wherein said storing the recommendation request comprises storing at least one of time details, recommendation details, electronic medium details, an email address, a uniform resource locator, and an internet protocol address.

11. The method of claim 3 further comprising:
   receiving a purchase request; and
   storing the purchase request in a database.

12. The method of claim 11 further comprising determining a recommendation chain of users in the recommendation network leading to the purchase request.

13. The method of claim 12 further comprising rewarding at least one user of the recommendation chain.

14. The method of claim 11 further comprising creating a report.

15. A system for recommending a product over a computer network the system comprising computer executable code modules stored in a memory of a computer wherein the code modules are executed by a processor of the computer which is in communication with the memory, the memory comprising:
   an initiating module for initiating a recommendation network by creating an active advertisement object on an electronic medium, wherein the active advertisement object comprises information representing a product;

a receiving module for receiving a request from a user viewing the electronic medium;

a recreating module for recreating the active advertisement object on another electronic medium, and for modifying an electronic display of a user computing device in communication with the computer network such that at least some information representing the product is visually depicted on the display;

a storing module for storing the request from the user; and a reporting module for reporting on the recommendation network.

16. The invention of claim 15 further comprising:

a purchase module for processing a purchase of the product; and a rewarding module for rewarding users in a recommendation chain of the recommendation network.

17. A physical computer storage device having stored thereon instruction for recommending a product over a computer network which, when executed by a processor, causes the processor to perform the steps of:

initiating a recommendation network by creating an active advertisement object on an electronic medium, wherein the active advertisement object comprises information representing a product;

receiving a recommendation request from a user viewing the electronic medium to recommend the product to at least one more user, wherein the user and the at least one more recommended user form a recommendation network;

recreating the active advertisement object on another user-selected electronic medium, wherein the step of recreating comprises modifying an electronic display of a user computing device in communication with the computer network such that at least some information representing the product is visually depicted on the display; and repeating said receiving a recommendation request and said recreating.

18. The physical computer storage device of claim 17 having stored thereon instruction for recommending a product over a computer network which, when executed by a processor, causes the processor to further perform the steps of:

receiving a purchase request;

determining a recommendation chain of users in the recommendation network leading to the purchase request; and rewarding at least one user of the recommendation chain.

* * * * *